US009995129B2

(12) United States Patent
Dykstra et al.

(10) Patent No.: US 9,995,129 B2
(45) Date of Patent: Jun. 12, 2018

(54) DRILLING AUTOMATION USING STOCHASTIC OPTIMAL CONTROL

(71) Applicant: Halliburton Energy Services, Inc., Houston, TX (US)

(72) Inventors: Jason Dykstra, Carrollton, TX (US); Yuzhen Xue, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 278 days.

(21) Appl. No.: 15/023,105

(22) PCT Filed: Oct. 21, 2013

(86) PCT No.: PCT/US2013/065895
§ 371 (c)(1),
(2) Date: Mar. 18, 2016

(87) PCT Pub. No.: WO2015/060810
PCT Pub. Date: Apr. 30, 2015

(65) Prior Publication Data
US 2016/0230530 A1    Aug. 11, 2016

(51) Int. Cl.
*E21B 44/04* (2006.01)
*E21B 44/00* (2006.01)
(Continued)

(52) U.S. Cl.
CPC .......... *E21B 44/04* (2013.01); *E21B 41/0092* (2013.01); *E21B 44/00* (2013.01);
(Continued)

(58) Field of Classification Search
CPC ...... E21B 44/00; E21B 41/0092; E21B 44/04; E21B 44/06; E21B 45/00; G05B 13/041; G06F 17/11
(Continued)

(56) References Cited

U.S. PATENT DOCUMENTS 6,612,382 B2 * 9/2003 King ..................... E21B 7/00
175/40
6,732,052 B2 * 5/2004 Macdonald .......... E21B 44/005
175/24
(Continued)

FOREIGN PATENT DOCUMENTS

| EP | 1193366 A2 | 4/2002 |
| WO | 2009-114240 | 9/2009 |
| WO | 2010-039342 A1 | 4/2010 |

OTHER PUBLICATIONS

Search Report issued in related GB Application No. 1603219.5, dated Feb. 16, 2017 (7 pages).
(Continued)

*Primary Examiner* — Chun Cao
(74) *Attorney, Agent, or Firm* — John Wustenburg; Baker Botts L.L.P.

(57) ABSTRACT

An example method for drilling automation may comprise generating a model of a drilling system based, at least in part, on a first set of downhole measurements. The model may accept drilling parameters of the drilling system as inputs. A rate of penetration for the drilling system may be determined based, at least in part on the model. The model may be simulated using a first set of values for the drilling parameters, and a control policy for the drilling system may be calculated based, at least in part, on the rate of penetration and the results of the simulation. A control signal to the drilling system may be generated based, at least in part, on the control policy.

16 Claims, 4 Drawing Sheets

(51) Int. Cl.
  *E21B 41/00* (2006.01)
  *E21B 44/06* (2006.01)
  *E21B 45/00* (2006.01)
  *G05B 13/04* (2006.01)
  *G06F 17/11* (2006.01)

(52) U.S. Cl.
  CPC .............. *E21B 44/06* (2013.01); *E21B 45/00* (2013.01); *G05B 13/041* (2013.01); *G06F 17/11* (2013.01)

(58) Field of Classification Search
  USPC .......................................................... 700/275
  See application file for complete search history.

(56) References Cited

U.S. PATENT DOCUMENTS

| | | |
|---|---|---|
| 7,172,037 B2 | 2/2007 | Dashevskiy et al. |
| 8,214,188 B2 * | 7/2012 | Bailey ....................... E21B 7/00 702/6 |
| 8,274,399 B2 | 9/2012 | Strachan et al. |
| 2003/0015351 A1 | 1/2003 | Goldman et al. |
| 2004/0256152 A1 | 12/2004 | Dashevskiy et al. |
| 2005/0284661 A1 | 12/2005 | Goldman et al. |
| 2006/0180356 A1 | 8/2006 | Durairajan et al. |
| 2007/0067147 A1 | 3/2007 | Huang |
| 2009/0090555 A1 * | 4/2009 | Boone ....................... E21B 7/04 175/45 |
| 2011/0172976 A1 | 7/2011 | Budiman et al. |
| 2011/0186353 A1 | 8/2011 | Turner et al. |
| 2012/0203525 A1 * | 8/2012 | Rodriguez Herrera .................... E21B 47/022 703/2 |
| 2012/0316787 A1 | 12/2012 | Moran et al. |
| 2013/0000980 A1 | 1/2013 | Dolgin et al. |
| 2013/0066471 A1 | 3/2013 | Wang et al. |

OTHER PUBLICATIONS

International Search Report and Written Opinion issued in related PCT Application No. PCT/US2013/065895 dated Jul. 15, 2014, 17 pages.

International Preliminary Report on Patentability issued in related Application No. PCT/US2013/065895, dated May 6, 2016 (13 pages).

* cited by examiner

DRILLING AUTOMATION USING STOCHASTIC OPTIMAL CONTROL

CROSS-REFRENCE TO RELATED APPLICATION

The present application is a U.S. National Stage Application of International Application No. PCT/US2013/065895 filed Oct. 21, 2013, which is incorporated herein by reference in its entirety for all purposes.

BACKGROUND

Hydrocarbons, such as oil and gas, are commonly obtained from subterranean formations that may be located onshore or offshore. In most cases, the formations are located thousands of feet below the surface, and a wellbore must intersect the formation before the hydrocarbon can be recovered. Drilling a wellbore is both labor and equipment intensive, and the cost of the drilling operation increases the longer the operation takes.

FIGURES

Some specific exemplary embodiments of the disclosure may be understood by referring, in part, to the following description and the accompanying drawings.

Figure 1:
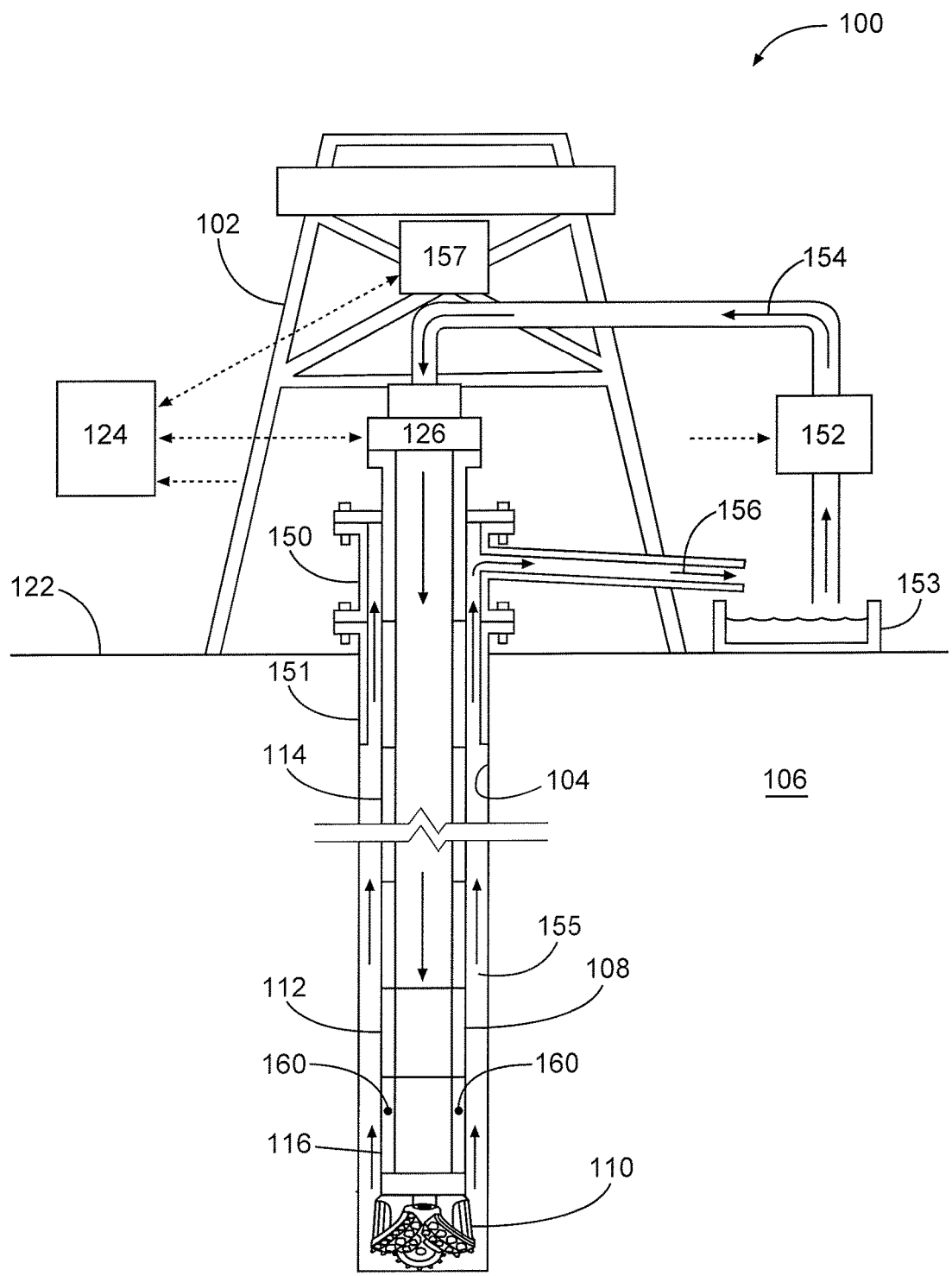
FIG. 1 is a diagram of an example drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The present disclosure describes an automated control system and method to increase the rate-of-penetration (ROP) for a drilling operation. The ROP is characterized by the speed at which a drill bit breaks through rock to extend a wellbore. Increasing the ROP decreases the time it takes to reach a target formation and, therefore, decreases the expense of drilling the well. Although the automated control system and method described herein is directed to increasing the ROP of a drilling operations, the control system and method may be adapted to optimize other aspects of a drilling operation.

FIG. 1 is a diagram of an example drilling system 100, according to aspects of the present disclosure. The drilling system 100 may include a rig 102 mounted at the surface 122, positioned above a borehole 104 within a subterranean formation 106. Although the surface 122 is shown as land in FIG. 1, the drilling rig 102 of some embodiments may be located at sea, in which case the surface 122 would comprise a drilling platform. A drilling assembly may be at least partially disposed within the borehole 104. The drilling assembly may comprise a drill string 114, a bottom hole assembly (BHA) 108, a drill bit 110, and a top drive or rotary table 126.

The drill string 114 may comprise multiple drill pipe segments that are threadedly engaged. The BHA 108 may be coupled to the drill string 114, and the drill bit 110 may be coupled to the BHA 108. The top drive 126 may be coupled to the drill string 114 and impart torque and rotation to the drill string 114, causing the drill string 114 to rotate. Torque and rotation imparted on the drill string 114 may be transferred to the BHA 108 and the drill bit 110, causing both to rotate. The torque at the drill bit 110 may be referred to as the torque-on-bit (TOB) and the rate of rotation of the drill bit 110 may be expressed in rotations per minute (RPM). The rotation of the drill bit 110 by the top drive 126 may cause the drill bit 110 to engage with or drill into the formation 106 and extend the borehole 104. Other drilling assembly arrangements are possible, as would be appreciated by one of ordinary skill in the art in view of this disclosure.

The BHA 108 may include tools such as LWD/MWD elements 116 and telemetry system 112, and may be coupled to the drill string 114. The LWD/MWD elements 116 may comprise downhole instruments, including sensors 160. While drilling is in progress, sensors 160 and other instruments in the BHA 108 may continuously or intermittently monitor downhole drilling characteristics and downhole conditions. Example downhole conditions include formation resistivity, permeability, etc. Example downhole drilling characteristics include the rate of rotation of the drill bit 110, the TOB, and the weight on the drill bit 110 (WOB). Information generated by the LWD/MWD element 116 may be stored while the instruments are downhole, and recovered at the surface later when the drill string is retrieved. In certain embodiments, information generated by the LWD/MWD element 116 may be communicated to the surface using telemetry system 112. The telemetry system 112 may provide communication with the surface over various channels, including wired and wireless communications channels as well as mud pulses through a drilling mud within the borehole 104.

The drill string 114 may extend downwardly through a surface tubular 150 into the borehole 104. The surface tubular 150 may be coupled to a wellhead 151 and the top drive 126 may be coupled to the surface tubular 150. The wellhead 151 may include a portion that extends into the borehole 104. In certain embodiments, the wellhead 109 may be secured within the borehole 104 using cement, and may work with the surface tubular 108 and other surface equipment, such as a blowout preventer (BOP) (not shown), to prevent excess pressures from the formation 106 and borehole 104 from being released at the surface 103.

During drilling operations, a pump 152 located at the surface 122 may pump drilling fluid at a pump rate (e.g., gallons per minutes) from a fluid reservoir 153 through the upper end of the drill string 114. The pump rate at the pump 152 may correspond to a downhole flow rate that varies from the pump rate due to fluid loss within the formation 106. As indicated by arrows 154, the drilling fluid may flow down the interior of drill string 114, through the drill bit 106 and into a borehole annulus 155. The borehole annulus 155 is created by the rotation of the drill string 114 and attached drill bit 110 in borehole 104 and is defined as the space between the interior/inner wall or diameter of borehole 104 and the exterior/outer surface or diameter of the drill string 114. The annular space may extend out of the borehole 104, through the wellhead 151 and into the surface tubular 150. The surface tubular 150 may be coupled to a fluid conduit 156 that provides fluid communication between the surface tubular 150 and the surface reservoir 153. Drilling fluid may exit from the borehole annulus 155 and flow to the surface reservoir 153 through the fluid conduit 156.

In certain embodiments, at least some of the drilling assembly, including the drill string 114, BHA 108, and drill bit 110 may be suspended from the rig 102 on a hook assembly 157. The total force pulling down on the hook assembly 157 may be referred to as the hook load. The hook load may correspond to the weight of the drilling assembly less any force that reduces the weight. Example forces include friction along the wall of the borehole 104 and buoyant forces on the drillstring 114 caused by its immersion in drilling fluid. When the drill bit 110 contacts the bottom of the formation 106, the formation 106 will offset some of the weight of the drilling assembly, and that offset may correspond to the WOB of the drilling assembly. The hook assembly 157 may include a weight indicator that shows the amount of weight suspended from the hook 157 at a given time. In certain embodiments, the hook assembly 157 may include a winch, or a separate winch may be coupled to the hook assembly 157, and the winch may be used to vary the hook load/WOB.

In certain embodiments, the drilling system 100 may comprise a control unit 124 positioned at the surface 122. The control unit 124 may comprise an information handling system that implements a control system or a control algorithm for the drilling system 100. The control unit 124 may be communicably coupled to one or more elements of the drilling system 100, including the pump 152, hook assembly 157, LWD/MWD elements 116, and top drive 126. In certain embodiments, the control system or algorithm may cause the control unit 124 to generate and transmit control signals to one or more elements of the drilling system 100.

In certain embodiments, the control unit 124 may receive inputs from the drilling system 100 and output control signals based, at least in part, on the inputs. The inputs may comprise information from the LWD/MWD elements, including downhole conditions and downhole drilling characteristics. The control signals may alter one or more drilling parameters of the drilling system 100. Example drilling parameters include the rate of rotation and torque of top drive 126, the hook load, the pump rate of the pump 152, etc. The control signals may be directed to the elements of the drilling system 100 generally, or to actuators or other controllable mechanisms within the elements. For example, the top drive 126 may comprise an actuator through which torque and rotation imparted on the drill string 114 are controlled. Likewise, hook assembly 157 may comprise an actuator coupled to the winch assembly that controls the amount of weight borne by the winch, and therefore the hook load. In certain embodiments, some or all of the controllable elements of the drilling system 100 may include limited, integral control elements or processors that may receive a control signal from the control unit 124 and generate a specific command to the corresponding actuators or other controllable mechanisms.

The drilling parameters may correspond to the downhole drilling characteristics, such that altering a drilling parameter changes downhole drilling characteristics, although the changes may not be one-to-one due to downhole dynamics. A control signal directed to the pump 152 may vary the pump rate at which the drilling fluid is pumped into the drill string 114, which in turn alters a flow rate through the drilling assembly. A control signal directed to the hook assembly 157 may vary the hook load by causing a winch to bear more or less of the weight of the drilling assembly, which may affect both the WOB and TOB. A control signal directed to the top drive may vary the rotational speed and torque applied to the drill string 114, which may affect the TOB and the rate of rotation of the drill bit 110. Other control signal types would be appreciated by one of ordinary skill in the art in view of this disclosure.

Figure 2:
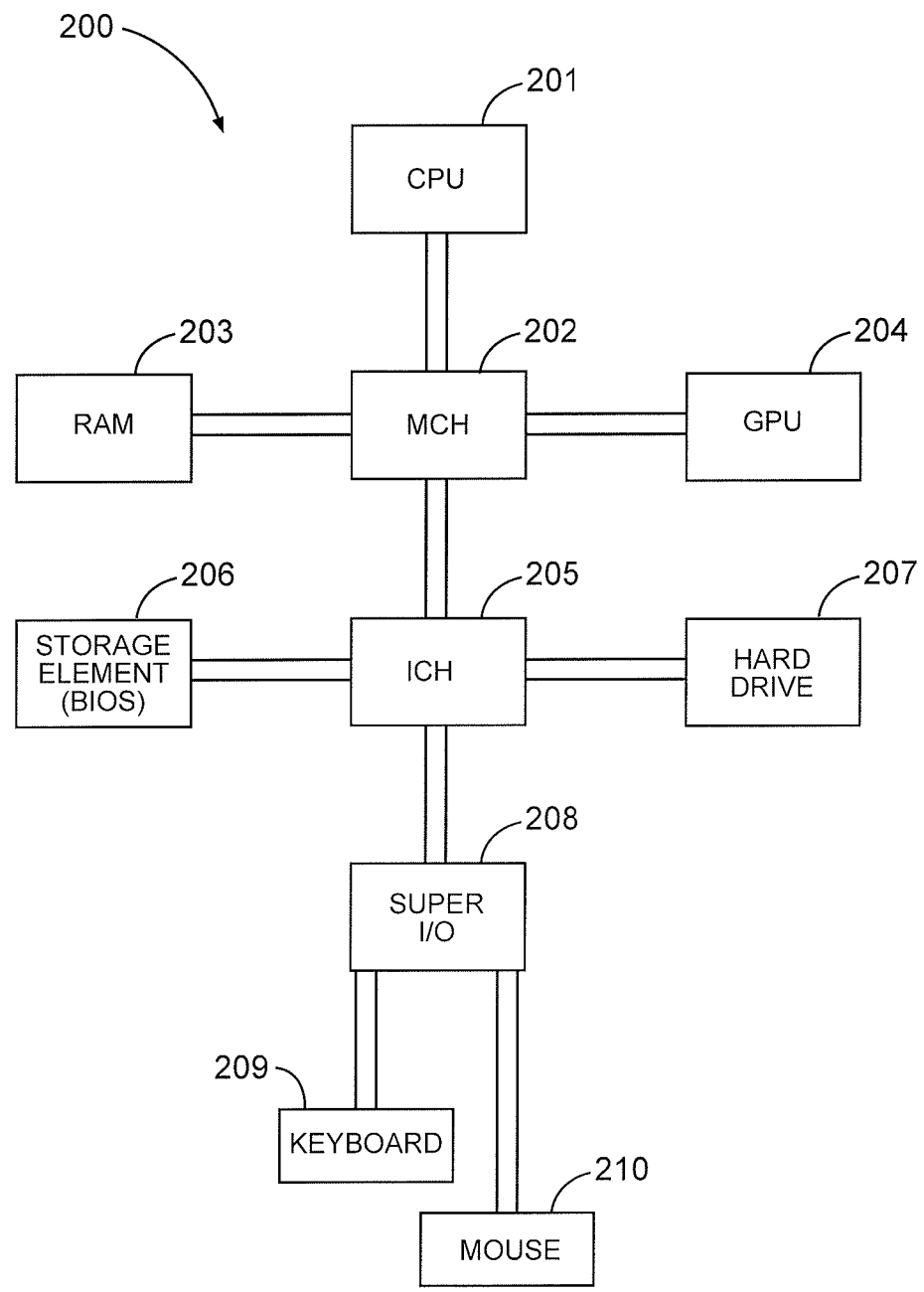
FIG. 2 is a diagram of an example information handling system, according to aspects of the present disclosure.

FIG. 2 is a block diagram showing an example information handling system 200, according to aspects of the present disclosure. Information handling system 200 may be used, for example, as part of a control system or unit for a drilling assembly. For example, a drilling operator may interact with the information handling system 200 to alter drilling parameters or to issue control signals to drilling equipment communicably coupled to the information handling system 200. The information handling system 200 may comprise a processor or CPU 201 that is communicatively coupled to a memory controller hub or north bridge 202. Memory controller hub 202 may include a memory controller for directing information to or from various system memory components within the information handling system, such as RAM 203, storage element 206, and hard drive 207. The memory controller hub 202 may be coupled to RAM 203 and a graphics processing unit 204. Memory controller hub 202 may also be coupled to an I/O controller hub or south bridge 205. I/O hub 205 is coupled to storage elements of the computer system, including a storage element 206, which may comprise a flash ROM that includes a basic input/output system (BIOS) of the computer system. I/O hub 205 is also coupled to the hard drive 207 of the computer system. I/O hub 205 may also be coupled to a Super I/O chip 208, which is itself coupled to several of the I/O ports of the computer system, including keyboard 209 and mouse 210.

The information handling system 200 further may be communicably coupled to one or more elements of a drilling system though the chip 208.

Control systems and methods incorporating aspects of the present disclosure may be used to automatically control drilling parameters to increase the ROP of the drilling system. As will be described below, example control systems and methods may include stochastic controls to account for uncertainties in the dynamics of a drilling system that cause unpredictable and random behavior at the drill bit. These uncertainties include the profile of the rock in front of the drill bit, vibrations in the drill bit, the effects of drilling fluid on the profile of the borehole, and the angle at which the drill bit contacts the rock. Unpredictable and random behavior at the drill bit reduces the control over the drill bit from the surface and decreases the overall ROP of the drilling system.

Figure 3:
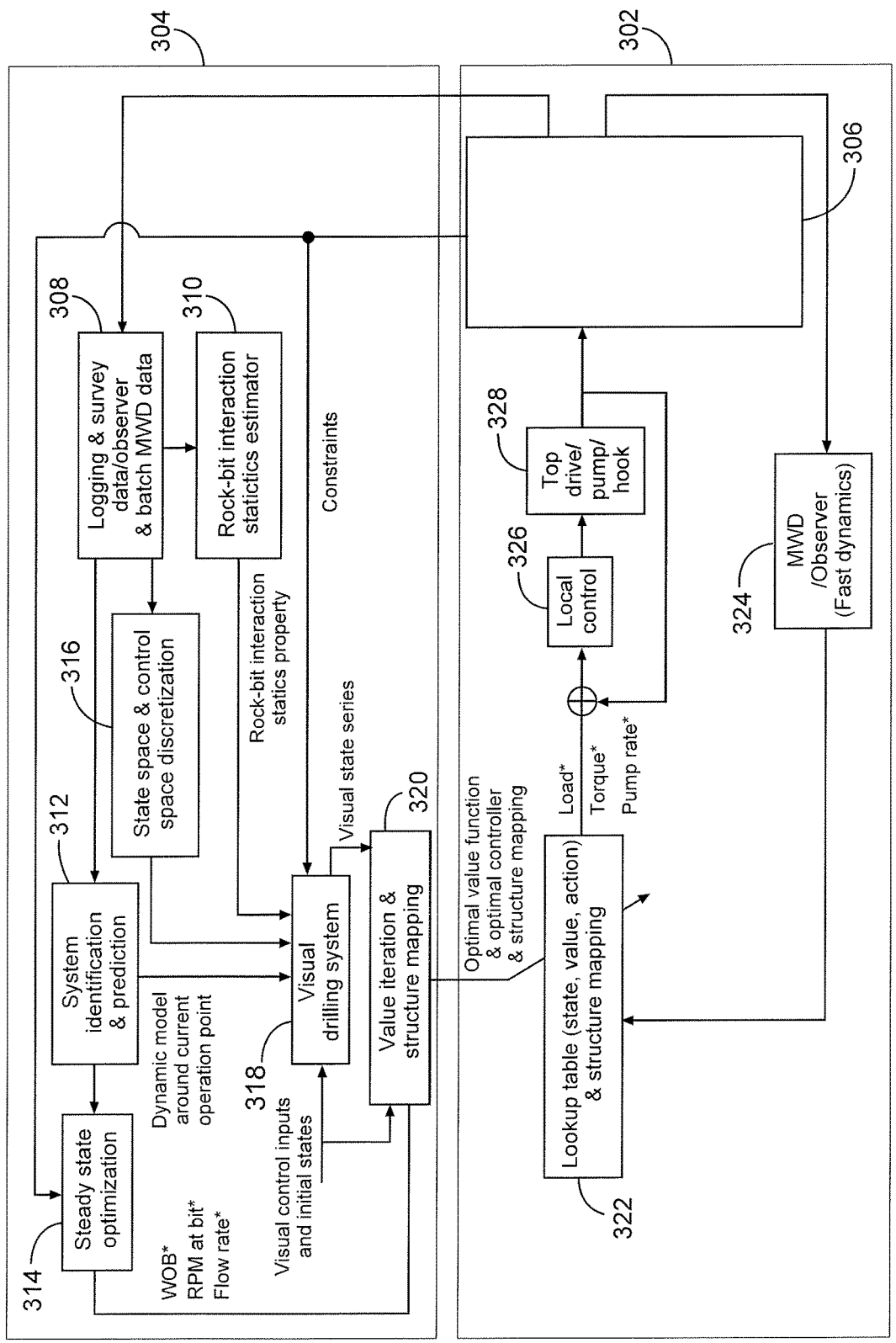
FIG. 3 is a block diagram of an example control architecture for a drilling system, according to aspects of the present disclosure.

FIG. 3 is a block diagram of an example control architecture 300 for a drilling system, according to aspects of the present disclosure. The control architecture 300 may be generated, located, and/or implemented in one or more information handling systems at a rig site or remote from a rig site. The control architecture 300 may comprise an on-line portion 302 and a semi-offline portion 304. The on-line portion 302 may be characterized by real-time or near real-time processing of inputs from a drilling system 306 to generate control signals to the drilling systems 306 using a control policy generated by the semi-off-line portion 304. The semi-off-line portion 304 may be characterized by computationally intensive processing steps to generate the control policy, the processing steps performed intermittently upon receipt of downhole data. The use of an on-line portion 302 and a semi-offline portion 304 provides a computationally complex control architecture 300 that does not significantly decrease the real-time speed of the controller.

In certain embodiments, the semi-offline portion 304 may adaptively model the drilling system 306 using batch data from LWD/MWD elements of the drilling system 306. The model of the drilling system 306 may comprise a low-dimensional state space model. As used here, a state space model may comprise a mathematical model of a drilling system with a set of input, output and state variables related by first-order differential equations. The model may, for example, be derived from a first principles of physics based approach, using data from the drilling system 306 as well as data from other wells with similar rock mechanics. The unpredictable and random behavior at the drill bit may be accounted for as Gaussian noise within the model.

The inputs to the model may comprise drilling parameters such as torque at the top drive, the pump rate of a pump, and hook load that affect the ROP of the drilling assembly. The outputs of the model may comprise downhole drilling characteristics, such as WOB, TOB, rate of rotation at the drill bit, and flow rate through the drilling assembly. The state variables may comprise dynamics of the drilling system 306, such as fluid flow dynamics, drill pipe motion, top drive motor excitation dynamics, etc. An example state space model formula is shown in Equation (1), where x corresponds to the model state, u corresponds to the inputs, v corresponds to the uncertainty/noise in the model, f corresponds to the drilling system dynamics model, and $x^*$ corresponds to the output.

$$\dot{x} = f(x, u, v)$$ Equation (1):

Notably, the model parameters are associated with slowly varying dynamics such as bit wear, formation change and thus are changing slowly. Thus, the current model can be used to predict future behavior over a future time horizon. The model can be updated over time, as new data from the drilling system 306 is received.

The semi-off-line portion 304 may receive batch LWD/MWD/survey data 308 from the drilling system 306. The batch LWD/MWD/survey data 308 may comprise downhole conditions, downhole drilling characteristics, dynamics, and survey data, including, but not limited to, WOB, TOB, rotation rate at the drill bit, formation resistivity, formation permeability, formation fluid data, etc. The batch LWD/MWD/survey data 308 may be generated and accumulated at downhole LWD/MWD elements of the drilling system 306 and retrieved intermittently at the surface. For example, the data may be stored in a downhole storage medium coupled to the LWD/MWD elements and downloaded or retrieved when the storage medium is retrieved at the surface. In other embodiments, the data may be transferred as a batch file over a downhole telemetry system, using wireline communications, wireless communications, fiber optic communication, or mud pulses.

The semi-offline portion 304 may comprise a rock-bit interaction statistics estimator 310 that receives at least portions of the batch LWD/MWD/survey data 308. The rock-bit interaction statistics may represent the unpredictable and random behavior at the drill bit, characterized by the interaction between the drill bit and the rock in front of the drill bit. The estimator 310 may receive the batch LWD/MWD/survey data 308 and estimate the statistics of the rock-bit interaction. In certain embodiments, the WOB and TOB measurements from the batch LWD/MWD/survey data 308 may be received at the estimator 310, which then estimates the rock-bit interaction statistics to determine parameters for the Gaussian noise corresponding to the unpredictable and random behavior at the drill bit.

In certain embodiments, the model of the drilling system 306 may be constructed at a system identification element 312 of the semi-offline portion 304. The system identification element 312 may receive the batch LWD/MWD/survey data 308 and use statistical methods to build a mathematical model of the drilling system 306 that corresponds to the batch LWD/MWD/survey data 308. In particular, the system identification element 308 may account for the actual measurements in the batch LWD/MWD/survey data 308 by generating a model of the drilling system 306 that is statistically most likely to produce the batch LWD/MWD/survey data 308. As is described above, the model may comprise a state space model derived from a first principles of physics based approach.

The model may be received from the system identification element 312 at a steady state optimization element 314. The steady state optimization element 314 may further receive constraints of the drilling system 306. The constraints may correspond to physical constraints of the drilling system 306—including the maximum RPM of the top drive, the maximum torque at the top drive, the maximum pump rate at the pump, the maximum hook load, etc.—and may be calculated, for example, based on the known mechanical characteristics of the drilling system 306. The constraints may be used in conjunction with the model from the system identification element 312 to determine a maximum achievable ROP for the drilling system 306 in its current state. The maximum achievable ROP may correspond to optimal WOB, rotation rate at the drill bit, and flow rate values, which the steady state optimization element 314 may calculate and output.

In certain embodiments, the batch LWD/MWD/survey data 308 may also be received at an input and state space element 316. The element 316 may calculate possible inputs and states of the state space model generated by the system identification element 312. In particular, the element 316 may receive the batch LWD/MWD/survey data 308 and determine current effective ranges of inputs and states that are possible given the actual measurements in the batch LWD/MWD/survey data 308. The current effective ranges may include, but are not limited to, the range of torque at the top drive, the range of hooks loads, and the range of physical dynamic states, such as the rotation rate of the drill bit, that may produce the measured WOB, TOB, drill bit rate of rotation, and flow rate from the LWD/MWD/survey data 308. The current effective ranges of the inputs and states may be combined to form the input and state space for the model. In certain embodiments, the element 316 further may discretize the input and state space to simplify and reduce future calculations that use the input and state space, as will be described below.

The control architecture 300 may further comprise a visual drilling system element 318. The visual drilling system element 318 may receive the model from the system identification element 312, the rock-bit interaction statistics from the rock-bit interaction statistics estimator 310, constraints from the drilling system 306, and a discretized input and state space from the input and state space element 316. The visual drilling system element 318 may simulate the model under the constraints of the drilling system 306 using various control inputs and initial states that are input into the visual drilling system element 318. The control inputs and initial states input into the visual drilling system element 318 may be limited by the discretized input and state space from the input and state space element 316. In certain embodiments, the control inputs may comprise different values for the drilling parameters (e.g., hook loads, pump rate, torque/rate of rotation at the top drive) and the results of the simulation may be the WOB, rate of rotation of the drill bit, and flow rate that correspond to the control inputs at the initial states. The simulation may further identify the resulting WOB, rate of rotation of the drill bit, and flow rate over time for the control input values.

The simulation data from the visual drilling system element 318 may be passed to the value iteration and structure element 320. The value iteration and structure element 320 may comprise a cost function comprising a quadratic function of the tracking error between the optimal WOB, rotation rate at the drill bit, and flow rate values calculated by the steady state optimization element 314 and the WOB, rate of rotation of the drill bit, and flow rate values in the simulation data. The cost function may be constructed such that the cost function output is lowest when the simulation data is closest to the optimal WOB, rotation rate at the drill bit, and flow rate values calculated by the steady state optimization element 314, meaning the ROP is highest when the cost function is lowest. As example cost function is shown in Equation (2), where $x_i$ and $x_i^d$ are the measured and the desired values of the ith state, respectively; $u_j$ is the jth input; $w_i^s$ and are the weights for the states or the inputs; and $N_1$ and $N_2$ are the dimensions of the states and inputs respectively.

$$C(x, u) = \sum_{i=1}^{N_1} w_i^s (x_i - x_i^d)^2 + \sum_{j=1}^{N_2} w_j^u (u_j)^2 \qquad \text{Equation (2)}$$

The states may include, for example, the rotation rate, WOB, TOB, and the bit location, axial/rotational velocity, acceleration, etc.

The value iteration and structure element 320 may calculate a value function from the simulation data. The value function may comprise the averaged value of the accumulated cost function values over time. In certain embodiments, an initial value function may be calculated from the simulation data, and the value function may be iterated until it converges to an optimal value function, in which the minimum averaged cost function over time is provided. As example value function is shown below in Equation (3), where E corresponds to the expectation value.

$$J(x) = E\left\{ \int_{t=0}^{\infty} C(x(t), u(t)) \mid x_0 = x \right\} \quad \text{Equation (3)}$$

In this construction, minimizing J(x) is equivalent to minimize the cost function over time, i.e. to minimize the difference between the measured and the desired value of the states, as well as minimize the control effort. Notably, the state, cost and value functions all have different expressions for discrete time/continuous time, discrete space/continuous space. Equations (1)-(3) may be used in a continuous space, continuous time case.

In certain embodiments, the optimal value function may be used to calculate an optimal control policy 322 for the drilling system 306. In particular, for each of the discretized states, the optimal value function may be used to calculate an optimal control input that produces an optimal value. The optimal control input may include one or more drilling parameters for the drilling system 306. The results may be arranged into a lookup table which includes the discretized state, the optimized control input, and the optimal value for all possible discretized states of the drilling system 306.

In certain embodiments, the optimal control policy 322 arranged as the look-up table may be received in the on-line portion 302. Control signals for the drilling system 306 may be determined based, at least in part, on the optimal control policy 322. For example, the on-line portion 302 may comprise a drilling system motion observer 324 that estimates states of the drilling system 306 using real-time MWD data. The states estimated by the drilling system motion observer 324 may correspond to the states within the look-up table, and may be used to identify the optimal control input that corresponds to the real-time states of the drilling system 306. Notably, identifying the optimal control input from a look-up table is computationally simple, allowing for the optimal control input to be identified in near real-time without extensive calculations.

In certain embodiments, the states identified by the drilling system motion observer 324 may be continuous, rather than discretized. Although the continuous state may not be equal to any discretized state, the closest discretized state can be identified and selected. In other embodiments, a structure map can be calculated in the semi-offline portion 304 via machine learning methods or interpolations, for example, so that the optimal control policy for the continuous state is a combination of several adjacent discrete states.

In the embodiment shown, the optimal control input may comprise drilling parameter values for the drilling system 306. The drilling parameter values may be received at a local controller 326, which may generate control signals to one or more of the elements 328 corresponding to the drilling parameter values. In the embodiment shown, the drilling parameter values may comprise hook load, top drive torque, and pump rate values. The local controller 326 may generate a signal to cause the top drive in the drilling system 306 to move from a first torque value to the torque value from the optimal control input. Similar electrical signals may be generated for a pump and the pump rate value, and for a hook and the hook load value. A feedback mechanism may be included to ensure accuracy of the control signals generated by the local controller.

Figure 4:
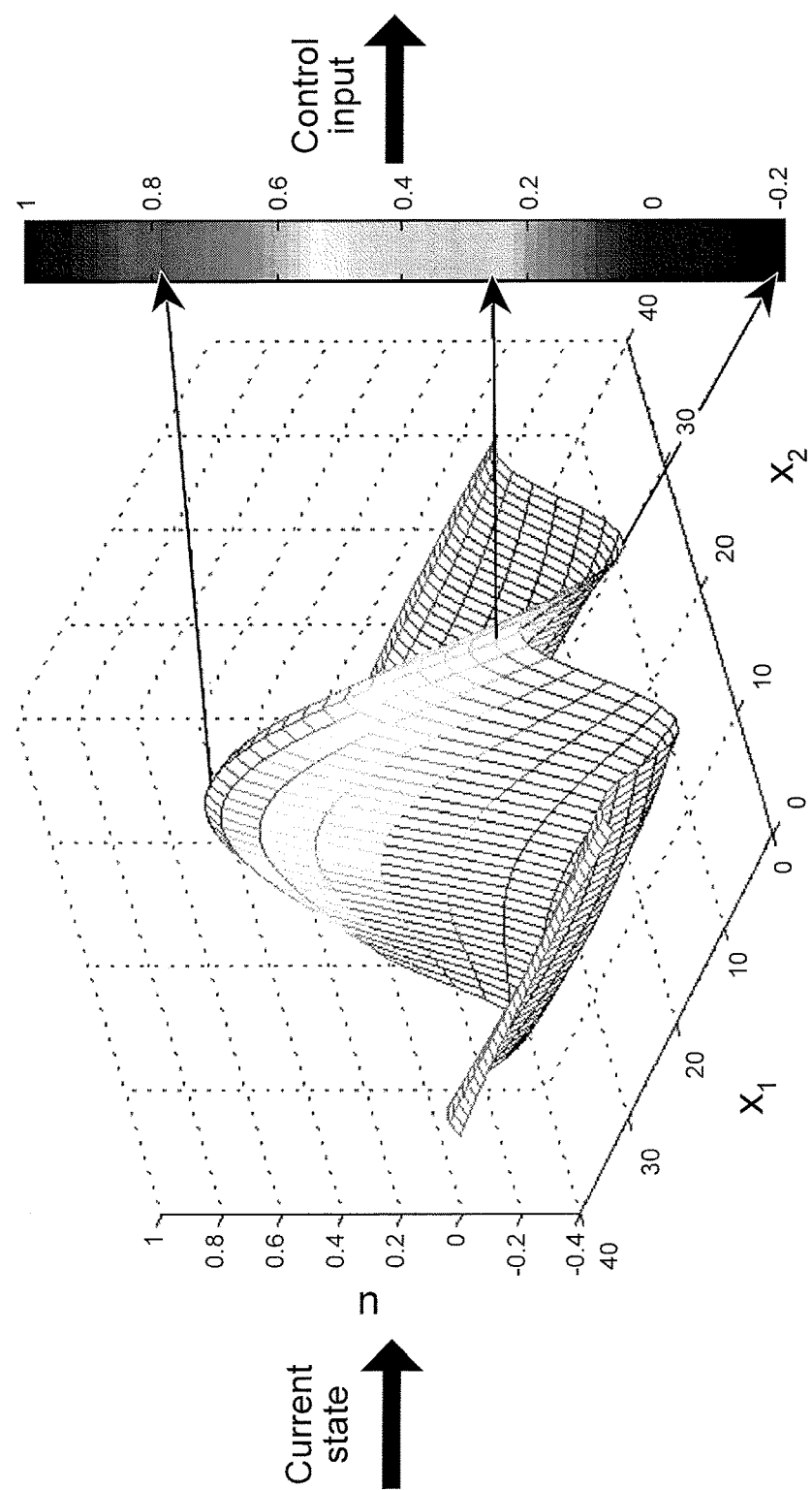
FIG. 4 is a diagram of an example optimal control input, according to aspects of the present disclosure.

FIG. 4 is a diagram illustrating an example optimal control input, according to aspects of the present disclosure. In the embodiment shown, the state space is two-dimensional ($x_1$ and $x_2$) and the optimal control input is one dimensional. A current state of the drilling system within the space state may be received, the current state including values in both dimensions of the optimal control input. An optimal control input value may be determined for the discretized space corresponding to the current state of the drilling system. In the embodiment shown, for example, the optimal control input may comprise 0.79 when the current state values for the drilling system are 20 and 18.

According to aspects of the present disclosure, an example method for drilling automation may comprise generating a model of a drilling system based, at least in part, on a first set of downhole measurements. The model may accept drilling parameters of the drilling system as inputs. A rate of penetration for the drilling system may be determined based, at least in part on the model. The model may be simulated using a first set of values for the drilling parameters, and a control policy for the drilling system may be calculated based, at least in part, on the rate of penetration and the results of the simulation. A control signal to the drilling system may be generated based, at least in part, on the control policy.

In certain embodiments, generating the model of the drilling system may comprise generating a space state model of the drilling system. Determining the rate of penetration for the drilling system may comprise determining a maximum rate of penetration for the drilling system. In certain embodiments, the drilling parameters of the drilling system may comprise a hook load of a hook of the drilling system, a pump rate of a pump of the drilling system, and a torque value of a top drive of the drilling system. The model may generate at as output at least one of a weight on a drill bit (WOB) of the drilling system, a rotation rate of the drill bit, and a flow rate of drilling fluid through the drilling system.

Generating the control signal to the drilling system may comprise generating a control signal corresponding to at least one of the drilling parameters. The maximum rate of penetration for the drilling system may be determined using values of the WOB, rotation rate, and flow rate that correspond to the maximum rate of penetration. In certain embodiments, simulating the model using the first set of values for the drilling parameters may comprise generating a second set of values for the WOB, rotation rate, and flow rate that correspond to the first set of values. Calculating the control policy for the drilling system may comprise comparing the second set of values to the values of the WOB, rotation rate, and flow rate that correspond to the maximum rate of penetration.

In certain embodiments, calculating the control policy for the drilling system further may further comprise tracking the differences between the second set of values and the values of the WOB, rotation rate, and flow rate that correspond to the maximum rate of penetration using a cost function, calculating a value function corresponding to the lowest average output of the cost function, calculating a control input for each of the state of the drilling system using the value function, and generating a look-up table containing the control inputs and the states of the drilling system. Generating the control signal to the drilling system based, at least in part, on the control policy may comprise generating a real-time estimation of a state of the drilling system, selecting a control input from the look-up table that corresponds to the estimated state, and generating the control signal for the drilling system using the control input.

In certain embodiments, the example method may further include receiving a second set of downhole measurements, generating a second model of the drilling system based, at least in part, on the second set of downhole measurements, calculating a second control policy based, at least in part, on the second model, and generating a second control signal to the drilling system based, at least in part, on the second control policy.

According to aspects of the present disclosure, an example apparatus for drilling automation may include a processor and a memory device coupled to the processor. The memory device may contain a set of instructions that, when executed by the processor, cause the processor to generate a model of a drilling system based, at least in part, on a first set of downhole measurements. The model may accept drilling parameters of the drilling system as inputs. The processor may determine a rate of penetration for the drilling system based, at least in part, on the model, and simulate the model using a first set of values for the drilling parameters. The processor may also calculate a control policy for the drilling system based, at least in part, on the rate of penetration and the results of the simulation, and generate a control signal to the drilling system based, at least in part, on the control policy.

In certain embodiments, the set of instructions that cause the processor to generate the model of the drilling system may further cause the processor to generate a space state model of the drilling system. The set of instructions that cause the processor to determine the rate of penetration for the drilling system may further cause the processor to determine a maximum rate of penetration for the drilling system. In certain embodiments, the drilling parameters of the drilling system may comprise a hook load of a hook of the drilling system, a pump rate of a pump of the drilling system, and a torque value of a top drive of the drilling system. The model may generate at as output at least one of a weight on a drill bit (WOB) of the drilling system, a rotation rate of the drill bit, and a flow rate of drilling fluid through the drilling system.

In certain embodiments, the set of instructions that cause the processor to generate the control signal to the drilling system may further cause the processor to generate a control signal corresponding to at least one of the drilling parameters. The set of instructions that cause the processor to determine the maximum rate of penetration for the drilling system may further cause the processor to determine values of the WOB, rotation rate, and flow rate that correspond to the maximum rate of penetration. In certain embodiments, the set of instructions that cause the processor to simulate the model using the first set of values for the drilling parameters may further cause the processor to generate a second set of values for the WOB, rotation rate, and flow rate that correspond to the first set of values In certain embodiments, the processor may calculate the control policy for the drilling system further by comparing the second set of values to the values of the WOB, rotation rate, and flow rate that correspond to the maximum rate of penetration. The set of instructions that cause the processor to calculate the control policy for the drilling system may further cause the processor to track the differences between the second set of values and the values of the WOB, rotation rate, and flow rate that correspond to the maximum rate of penetration using a cost function; calculate a value function corresponding to the lowest average output of the cost function; calculate a control input for each of the state of the drilling system using the value function; and generate a look-up table containing the control inputs and the states of the drilling system.

In certain embodiments, the set of instructions that cause the processor to generate the control signal to the drilling system based, at least in part, on the control policy further cause the processor to generate a real-time estimation of a state of the drilling system; select a control input from the look-up table that corresponds to the estimated state; and generate the control signal for the drilling system using the control input. In certain embodiments, the set of instructions may further cause the processor to receive a second set of downhole measurements; generate a second model of the drilling system based, at least in part, on the second set of downhole measurements; calculate a second control policy based, at least in part, on the second model; and generate a second control signal to the drilling system based, at least in part, on the second control policy Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for drilling automation, comprising:
    generating a model of a drilling system based, at least in part, on a first set of downhole measurements, the model accepting drilling parameters of the drilling system as inputs;
    determining a rate of penetration for the drilling system based, at least in part, on the model, wherein determining the rate of penetration for the drilling system comprises determining a maximum rate of penetration for the drilling system;
    simulating the model using a first set of values for the drilling parameters, wherein simulating the model using the first set of values for the drilling parameters comprises generating a second set of values for the WOB, rotation rate, and flow rate that correspond to the first set of values;
    calculating a control policy for the drilling system based, at least in part, on the rate of penetration and the results of the simulation, wherein calculating the control policy for the drilling system comprises comparing the second set of values to the values of a WOB, a rotation rate, and a flow rate that correspond to the maximum rate of penetration; and
    generating a control signal to the drilling system based, at least in part, on the control policy to alter one or more drilling operations of the drilling system.

2. The method of claim 1, wherein generating the model of the drilling system comprises generating a space state model of the drilling system.

3. The method of claim 1, wherein
the drilling parameters of the drilling system comprise
a hook load of a hook of the drilling system;
a pump rate of a pump of the drilling system; and
a torque value of a top drive of the drilling system; and
the model generates as an output at least one of
a weight on a drill bit (WOB) of the drilling system;
a rotation rate of the drill bit; and
a flow rate of drilling fluid through the drilling system.

4. The method of claim 3, wherein generating the control signal to the drilling system comprises generating a control signal corresponding to at least one of the drilling parameters.

5. The method of claim 3, wherein determining the maximum rate of penetration for the drilling system comprises determining values of the WOB, rotation rate, and flow rate that correspond to the maximum rate of penetration.

6. The method of claim 1, wherein calculating the control policy for the drilling system further comprises
tracking the differences between the second set of values and the values of the WOB, rotation rate, and flow rate that correspond to the maximum rate of penetration using a cost function;
calculating a value function corresponding to the lowest average output of the cost function;
calculating a control input for each of the state of the drilling system using the value function; and
generating a look-up table containing the control inputs and the states of the drilling system.

7. The method of claim 6, wherein generating the control signal to the drilling system based, at least in part, on the control policy comprises
generating a real-time estimation of a state of the drilling system;
selecting a control input from the look-up table that corresponds to the estimated state;
generating the control signal for the drilling system using the control input.

8. The method of claim 1, further comprising
receiving a second set of downhole measurements;
generating a second model of the drilling system based, at least in part, on the second set of downhole measurements;
calculating a second control policy based, at least in part, on the second model; and
generating a second control signal to the drilling system based, at least in part, on the second control policy.

9. An apparatus for drilling automation, comprising:
a processor;
a memory device coupled to the processor, wherein the memory device contains a set of instructions that, when executed by the processor, cause the processor to
generate a model of a drilling system based, at least in part, on a first set of downhole measurements, the model accepting drilling parameters of the drilling system as inputs;
determine a rate of penetration for the drilling system based, at least in part, on the model, wherein determining the rate of penetration for the drilling system comprises determining a maximum rate of penetration for the drilling system;
simulate the model using a first set of values for the drilling parameters, wherein simulating the model using the first set of values for the drilling parameters comprises generating a second set of values for the WOB, rotation rate, and flow rate that correspond to the first set of values;
calculate a control policy for the drilling system based, at least in part, on the rate of penetration and the results of the simulation, wherein calculating the control policy for the drilling system comprises comparing the second set of values to the values of a WOB, a rotation rate, and a flow rate that correspond to the maximum rate of penetration; and
generate a control signal to the drilling system based, at least in part, on the control policy to alter a drilling operation of the drilling system.

10. The apparatus of claim 9, wherein the set of instructions that cause the processor to generate the model of the drilling system further causes the processor to generate a space state model of the drilling system.

11. The apparatus of claim 9, wherein
the drilling parameters of the drilling system comprise
a hook load of a hook of the drilling system;
a pump rate of a pump of the drilling system; and
a torque value of a top drive of the drilling system; and
the model generates as an output at least one of
a weight on a drill bit (WOB) of the drilling system;
a rotation rate of the drill bit; and
a flow rate of drilling fluid through the drilling system.

12. The apparatus of claim 11, wherein the set of instructions that cause the processor to generate the control signal to the drilling system further cause the processor to generate a control signal corresponding to at least one of the drilling parameters.

13. The apparatus of claim 11, wherein the set of instructions that cause the processor to determine the maximum rate of penetration for the drilling system further cause the processor to determine values of the WOB, rotation rate, and flow rate that correspond to the maximum rate of penetration.

14. The apparatus of claim 9, wherein the set of instructions that cause the processor to calculate the control policy for the drilling system further cause the processor to
track the differences between the second set of values and the values of the WOB, rotation rate, and flow rate that correspond to the maximum rate of penetration using a cost function;
calculate a value function corresponding to the lowest average output of the cost function;
calculate a control input for each of the state of the drilling system using the value function; and
generate a look-up table containing the control inputs and the states of the drilling system.

15. The apparatus of claim 14, wherein the set of instructions that cause the processor to generate the control signal to the drilling system based, at least in part, on the control policy further cause the processor to
generate a real-time estimation of a state of the drilling system;
select a control input from the look-up table that corresponds to the estimated state;
generate the control signal for the drilling system using the control input.

16. The apparatus of claim 9, wherein the set of instructions further cause the processor to
receive a second set of downhole measurements;
generate a second model of the drilling system based, at least in part, on the second set of downhole measurements;

calculate a second control policy based, at least in part, on the second model; and generate a second control signal to the drilling system based, at least in part, on the second control policy.

* * * * *